United States Patent [19]

Hay

[11] Patent Number: 5,164,229

[45] Date of Patent: Nov. 17, 1992

[54] METHOD FOR COATING CONTINUOUS TOW

[75] Inventor: Randall S. Hay, Beavercreek, Ohio

[73] Assignee: The United States of America as represented by the Secretary of the Air Force, Washington, D.C.

[21] Appl. No.: 726,485

[22] Filed: Jul. 8, 1991

[51] Int. Cl.⁵ .................... B05D 3/02; B05D 1/18
[52] U.S. Cl. .................... 427/226; 427/314; 427/372.2; 427/434.6; 427/434.7; 118/405
[58] Field of Search .............. 427/434.7, 434.6, 314, 427/372.2, 226; 118/405

[56] References Cited

U.S. PATENT DOCUMENTS

| | | | |
|---|---|---|---|
| 2,366,077 | 12/1944 | Wildy et al. | 91/53 |
| 3,346,413 | 10/1967 | Lindemann | 117/102 |
| 3,533,761 | 10/1970 | Pierson | 29/191 |
| 3,574,665 | 4/1971 | Basche | 427/434.7 |
| 4,047,965 | 9/1977 | Karst et al. | 106/65 |
| 4,294,189 | 10/1981 | Ashida et al. | 118/603 |
| 4,294,190 | 10/1981 | Ohis | 118/620 |
| 4,376,803 | 3/1983 | Katzman | 427/314 |
| 4,522,148 | 6/1985 | Kassahun et al. | 118/405 |
| 4,671,911 | 6/1987 | Garnier et al. | 264/60 |
| 4,687,652 | 8/1987 | Yoldas et al. | 423/327 |
| 4,696,710 | 9/1987 | Minjolle et al. | 156/89 |
| 4,828,774 | 5/1989 | Anderson et al. | 264/60 |

OTHER PUBLICATIONS

"Alumina Sol Preparation From Alkoxides", Bolent E. Yoldas, Ceramic Bull. vol. 54, No. 3 (1975) 289-290.
"Preparation of Glasses and Ceramics From Metal-Organic Compounds", B. E. Yoldas, J. Matl. Sci., 12(1977) 1203-1208.
"Microstructure of Monolithic Materials Formed By Heat Treatment of Chemically Polymerized Precursors . . .", B. E. Yoldas, Cer. Bull. V59, No. 4, 479-483.
"Sol-Gel Processing of Ceramics and Glass" David W. Johnson, Jr., Cer. Bull. vol. 64 No. 12 (1985) 1597-1602.

Primary Examiner—Shrive Beck
Assistant Examiner—Katherine A. Bareford
Attorney, Agent, or Firm—Charles E. Bricker; Donald J. Singer

[57] ABSTRACT

A method for coating continuous tow which comprises the steps of: (a) transporting a tow through a coating composition to provide a coated tow having a layer of uncured coating thereon, (b) transporting the coated tow through a liquid which is immiscible with the coating composition and (c) curing the coating on the tow to provide a coated tow having a layer of cured coating on the individual filaments thereof, wherein the tow has contact only with the coating composition and the immiscible liquid between the uncoated state of the tow prior to coating step (a) and the cured, coated state of the tow subsequent to curing step (c).

4 Claims, 3 Drawing Sheets

METHOD FOR COATING CONTINUOUS TOW

RIGHT OF THE GOVERNMENT

The invention described herein may be manufactured and used by or for the Government of the United States for all governmental purposes without the payment of any royalty.

BACKGROUND OF THE INVENTION

This invention relates to a method for the coating of continuous tows.

Composite materials are widely known and widely used. By combining a polymer with another material, such as glass, carbon, another polymer, or the like, is it possible to obtain unique combinations or levels of properties. Similarly, by combining a metal or glass with selected fibers, it is possible to obtain unique combinations or levels of properties. Advanced composites have evolved as a class of structural materials as a result of the development of high-modulus, high-strength, low-density reinforcing fibers.

The presence of a carbon interlayer along the fiber-matrix interface has been shown to be responsible for the high toughness and strain to failure of Nicalon ® (SiC fiber)/lithium aluminosilicate glass composites and Nicalon ®/Ba-Si-Al oxynitride glass composites. However, these composites are not viable for high temperature oxidizing environments. Such environments require oxidation resistant fibers, matrices and interlayers. One approach to fabricating a fiber-matrix interface is to introduce an interlayer as a fiber coating before the composite is densified. After densification, the interlayer chosen should cause crack deflection and fiber pullout similar to carbon interlayers, or should provide oxidation resistance for other interlayers.

Several types or combinations of interlayers are considered to be feasible, including microporous interlayers, reactive interlayers which lose volume, and interlayers with ductile particles. However, application of a coating, particularly a uniform coating, to continuous fibers and fiber tows can be difficult. Measurement of coating thickness can also be difficult.

Several techniques are known for applying coatings to continuous fibers. Fiber coating may be accomplished by passing the fibers through a container filled with a coating liquid, which container has one or more rollers or wheels to keep the fiber immersed in the liquid while coating. One disadvantage of this process is that the fibers must be bent around the roller(s) or wheel(s) and may sustain damage from bending or abrasion. Another disadvantage is that the fibers may be contaminated from contact with the wheel or roller.

Coatings may also be applied by spraying. The primary disadvantage of this coating method is that spraying is a line of sight process, so coating thickness is dependent upon the angle at which the spray jet contacts the fiber. Other disadvantages are that spray jets tend to clog easily, the characteristics of the jet may change with time, making control of the process difficult, viscous coating solutions are difficult to apply as a spray, and low viscosity solutions tend to run off the fiber before they are cured.

Fibers may be coated by passing same through a container having a gasket which seals around the moving fiber and prevents coating liquid from flowing out. The disadvantages of this method are that the fiber surface may be contaminated or abraded by contact with the gasket, and fibers having irregular cross-sections or multifilament fibers or tows tend to get caught along irregularities or at broken fibers in gaskets tight enough to prevent leakage of the liquid.

The coating of multifilament tow or cloth is particularly vexing. Most methods used to apply liquid-based coatings to monofilaments do not uniformly coat individual filaments of a fiber tow or cloth because the coating cements the filaments together, or forms thin bridges between filaments. There are, however, methods which may be used to coat each filament individually.

If the coating liquid is a acidic sol, it may be applied in dilute concentration, then gelled on the individual filaments by passage through ammonia. The use of an ammonia atmosphere together with dilute acidic sols is a disadvantage.

The tow may be sprayed with a coating liquid. As mentioned previously, spraying is a line of sight process, so coating thickness depends on the angle of contact of the spray jet relative to each filament in the tow. Thus, some filaments may be completely shadowed by other filaments and receive no coating.

The individual filaments in a tow may be uniformly coated by chemical vapor deposition (CVD). Although this technique works well for many different types of tow and coatings, it carries with it several disadvantages, including slow coating rates, equipment expense, precursor expense and its unsuitability for applying complex oxide coatings.

It is an object of the present invention to provide a method for coating continuous tow.

Other objects, aspects and advantages of the present invention will become apparent to those skilled in the art from a reading of the following detailed description of the invention.

SUMMARY OF THE INVENTION

In accordance with the present invention, there is provided a method for coating continuous tow which comprises the steps of: (a) transporting a tow through a coating composition to provide a coated tow having a layer of uncured coating thereon, (b) transporting the coated tow through a liquid which is immiscible with the coating composition and (c) curing the coating on the tow to provide a coated tow having a layer of cured coating on the individual filaments thereof, wherein the tow has contact only with the coating composition and the immiscible liquid between the uncoated state of the tow prior to coating step (a) and the cured, coated state of the tow subsequent to curing step (c).

DESCRIPTION OF THE PREFERRED EMBODIMENTS

Figure 1:
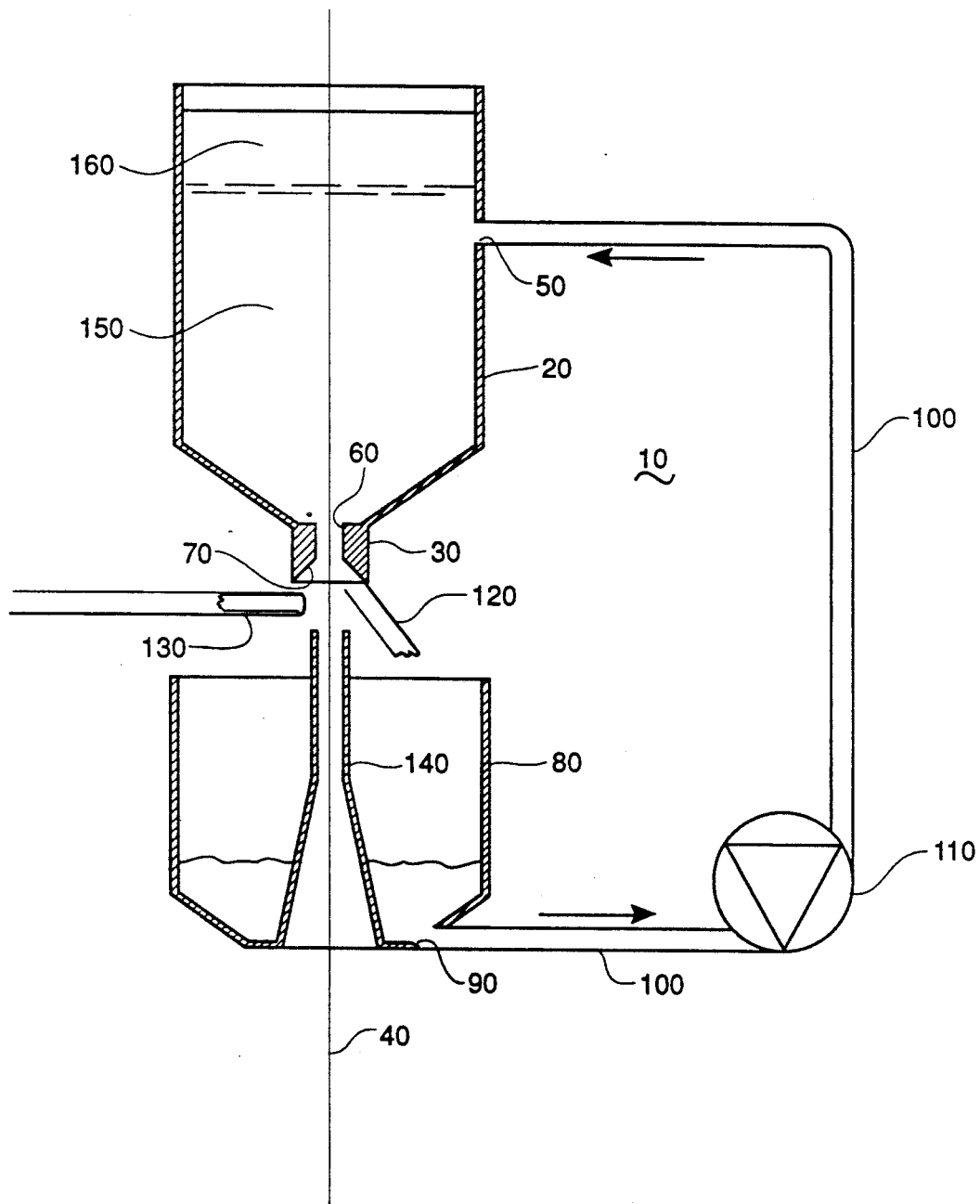
FIG. 1 illustrates the coating apparatus of this invention.

Referring to FIG. 1, a coating apparatus for use in this invention, designated generally by the numeral 10, comprises a coating composition container 20 having a nozzle 30 in the bottom portion thereof through which a continuous fiber 40 can be drawn. Inlet 50 is provided in container 20 for replenishing the coating composition.

Nozzle 30 has an throat passage or orifice 60 having an inner dimension sufficiently large that fiber 40 has no contact therwith, even with vertical misalignment of fiber 40. Nozzle 30 has an exit portion 70 which flares downwardly and outwardly. Because passage 60 has a dimension greater than that of the fiber 40, the coating composition continuously flows through passage 60. Catch vessel 80 is positioned below nozzle 30 to catch excess coating composition flowing therethrough. The coating composition in vessel 80 is continuously removed through outlet 90 and recycled by way of various conduits 100 and pump 110 to inlet 50 of container 20. Catch vessel 80 is shown as having an upwardly extending funnel-shaped standpipe 140 through which fiber 40 can pass.

The nozzle 30 is preferably fabricated from a material which is wetted by the coating composition. When such a material is employed, the excess coating composition, after leaving passage 60, will follow the exit wall 70 and discharge into the catch vessel 80. Container 20 may optionally be provided with a deflector spout 120 and a gas jet 130 positioned so as to propel excess coating composition away from fiber 40 and into catch vessel 80.

In the embodiment shown, container 20 contains a liquid coating composition, designated 150, and a liquid 160 which is immiscible with the coating composition.

The tows employed according to the invention are high strength tows comprising a plurality of fibers such as, for example, carbon or graphite, silica, silicon carbide, silicon nitride, silicon carbide-coated boron, boron carbide-coated boron, silicon-coated silicon carbide, alumina, mullite, yttrium-aluminum oxides, beryllium-titanium composites, boron-aluminosilicate, and the like.

The coating composition may be a clay slip or slurry, a solution of a metal salt or a polymer solution or a sol. A polymer solution is an inorganic oxide network containing glass- or ceramic-forming elements such as Si, Al, Ti, Zr and the like and, optionally, modifying elements such as Mg, B and the like. The oxide network is formed by controlled hydrolysis of an organo-metallic compound such as a metal alkoxide. The net reaction to form an anhydrous oxide is generally represented by:

$$M(OR)_n + xH_2O \longrightarrow M(OH)_x(OR)_{n-x} + xROH \qquad (1)$$

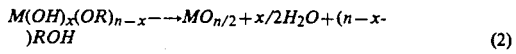

$$M(OH)_x(OR)_{n-x} \longrightarrow MO_{n/2} + x/2 H_2O + (n-x)ROH \qquad (2)$$

The hydrolysis reaction (1) may be catalyzed by the addition of acid or base. Depending on pH and water content, the hydrolysis of, for example, tetraethylorthosilicate (TEOS) can result in the formation of polymeric species ranging from polysiloxane chains to colloidal particles of essentially pure silicon dioxide. Conditions employed in the preparation of monolithic glasses or ceramics normally consist of the hydrolyzation of the alkoxide precursors with a small to large excess of water (in equation 1, above, x greater than n/2) at low to intermediate pH (about 1 to 9). These conditions can result in structures that are intermediate between linear chains and colloidal particles. The oxide network can be dried, then thermally converted to glass or ceramic. Multicomponent glasses/ceramic may be similarly prepared.

For use in the present invention, a solution is prepared containing at least about 1 weight percent, preferably at least about 4 weight percent equivalent oxide. The metal alkoxides may be prepared using techniques known in the art. For example, silicon tetrakis isopropoxide may be prepared by reacting silicon tetrachloride with isopropyl alcohol. As another example, aluminum trisisopropoxide may be prepared by the reaction of aluminum metal foil with excess isopropyl alcohol using mercuric chloride as a catalyst.

The metal alkoxide may be diluted with a C1 to C4 alcohol, e.g., methanol, ethanol, n-propanol, i-propanol, n-butanol, i-butanol, t-butanol or sec-butanol, preferably with the alcohol corresponding to the alkoxide group, to a concentration sufficiently low to avoid gellation when later hydrolyzed, yet sufficiently high to provide the desired concentration of equivalent oxide.

The ceramic materials include silicates, aluminates, yttriates, titanates, zirconates, and the like, as well as combinations therof, such as the aluminosilicates, yttrium-aluminum garnet and yttrium-aluminum monoclinic. These materials may, optionally, be modified with one or more of boron, alkali metals, alkaline earth metals, lead and the like.

In general, the immiscible liquid can be any liquid which is not miscible with the coating composition. Since the coating composition is, in general, a largely aqueous solution, the immiscible liquid can be any water-immiscible hydrocarbon. The immiscible liquid should satisfy the relation:

$$\gamma_{IF} > \gamma_{IC} + \gamma_{CF} \qquad (3)$$

where $\gamma$ represents the interfacial energy or tension, and the subscripts I, C and F refer to immiscible liquid, coating composition and filament, respectively. It is also advantageous if the immiscible liquid wets the coating composition/air interface, as expressed by the relation:

$$\gamma_{AC} > \gamma_{IC} + \gamma_{AI} \qquad (4)$$

where the subscripts C and I are as above and the subscript A refers to air. Good results have been obtained using hexane as the immiscible liquid. Other liquids which may be employed include heptane, perfluorohexane, dichlorohexane, 1-octanol, isoamyl alcohol and the like.

Figure 2:
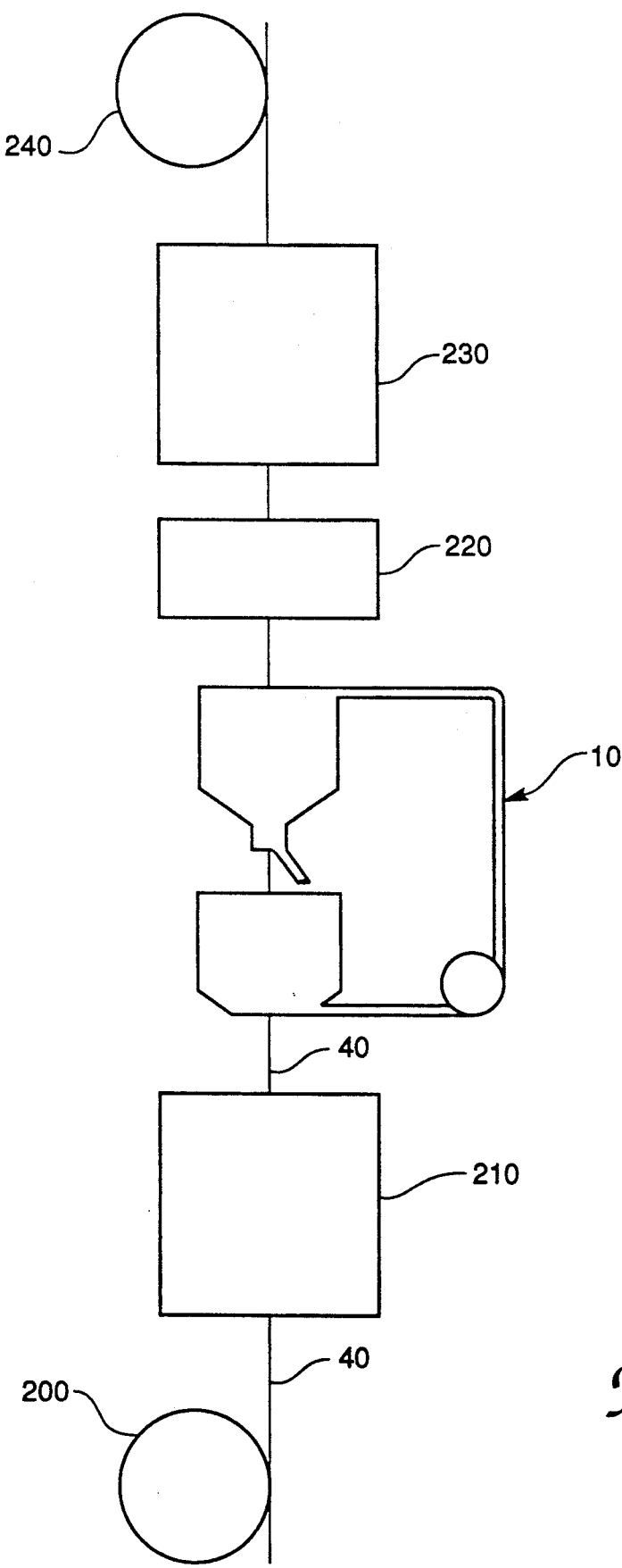
FIG. 2 illustrates an overall coating process.

FIG. 2 illustrates the overall process of this invention wherein uncoated continuous tow 40 is provided from a source, not shown, to lower alignment and tensioning means 200 which aligns the fiber for a pass through the coating apparatus. Tow 40 is passed through a first furnace 210, through the coating apparatus 10, through drying means 220, through a second furnace 230 to an upper alignment and tensioning means 240, thence to takeup means, not shown. The first furnace 210 is operated at a temperature sufficient to clean and/or burn off sizing from the tow to be coated, i.e., about 500° C. to 1000° C.; this step may be omitted if the tow is known to have a clean surface. The drying means 220 is operated at a temperature sufficient to drive off a majority of the immiscible liquid, i.e., about 100° C. to 250° C. The second furnace 230 is preferably operated at a temperature sufficient to calcine the coating applied, i.e., about 750° C. to 1500° C.

Figure 3:
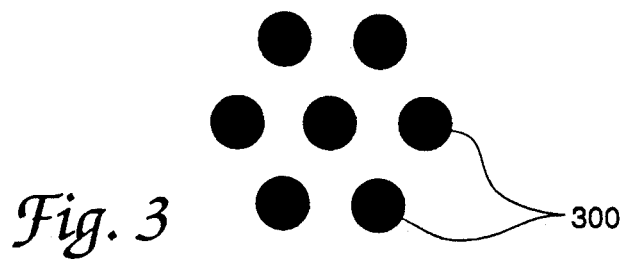
FIGS. 3, 4, 5, 6, 7 and 8 illustrate a bundle of tow fibers at each stage of the coating process.
Figure 4:
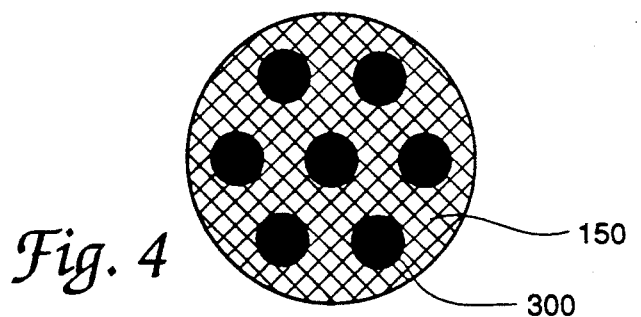
Figure 5:
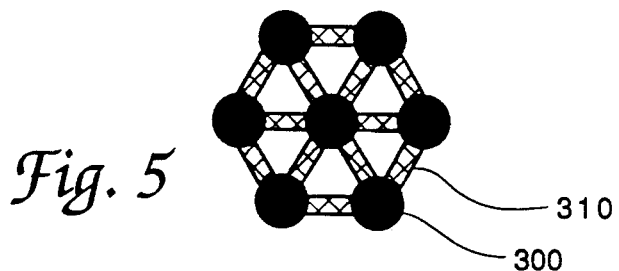

FIG. 3 represents a tow having a plurality of fibers 300. With reference to FIG. 1, as the tow is transported through the coating composition 150 in container 20, the composition penetrates between individual fibers 300, wets them and displaces air between them, as shown in FIG. 4. If the thus-coated tow were now calcined, the result would be as shown in FIG. 5, with bridges of cured coating 310 between fibers 300.

Figure 6:
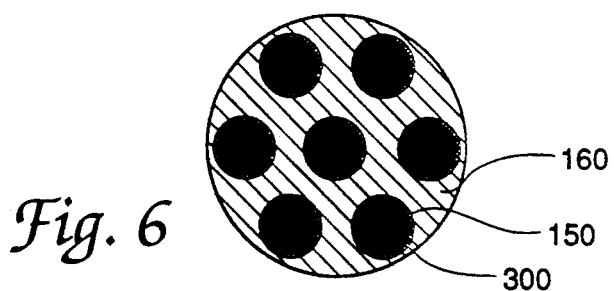
Figure 7:
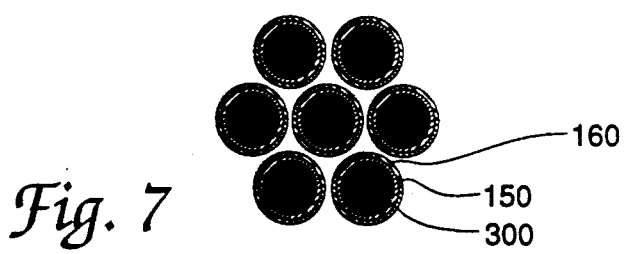
Figure 8:
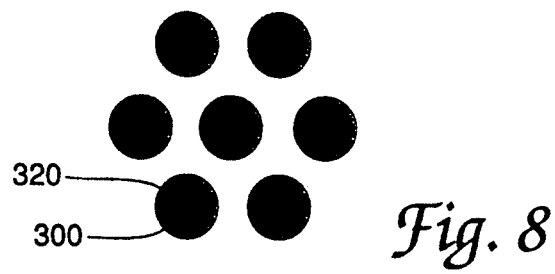

Referring again to FIG. 1, the coated tow is transported through the immiscible liquid layer 160, wherein a major portion of the coating composition is displaced by the immiscible liquid, as illustrated by FIG. 6. As the tow is transported out of the immiscible liquid 160, a major portion of the liquid flows away from the tow, leaving a two-layered coating of coating composition 150 and immiscible liquid 160 on fibers 300, as shown in FIG. 7. is the tow is transported through the drying means 220 and furnace 230, the immiscible liquid is evaporated from the surface and the coating composition is converted to the desired coating 320, as shown in FIG. 8.

Although the method of this invention has been illustrated and described with the tow being transported through the apparatus in the upward direction, it is within the scope of the invention to coat tow by transporting same in the downward direction, through proper choice of coating composition and immiscible liquid.

Various modifications may be made to the invention as described without departing from the spirit of the invention or the scope of the appended claims.

We claim:

1. A method for coating fibers in a continuous tow which comprises the steps of:
   (a) transporting a tow through an inorganic aqueous coating solution to provide a coated tow having a layer of uncured coating thereon,
   (b) transporting the coated tow through a hydrocarbon liquid which is immiscible with the coating solution and
   (c) calcining the coating on the tow to provide a coated tow having a layer of cured coating on the individual filaments thereof,
   wherein the tow has contact only with the coating solution and the immiscible liquid between the uncoated state of the tow prior to coating step (a) and the cured, coated state of the tow subsequent to calcining step (c).

2. The method of claim 1 wherein said tow comprises a plurality of fibers selected from the group consisting of carbon, graphite, silica, silicon carbide, silicon nitride, silicon carbide-coated boron, boron carbide-coated boron, silicon-coated silicon carbide, alumina, mullite, yttrium-aluminum oxides, beryllium-titanium composites, and boron-aluminosilicate.

3. The method of claim 2 further comprising the step of heat treating said tow at a temperature of about 500° C. to 1000° C. prior to said coating step (a).

4. A method for coating fibers in a continuous tow which comprises the steps of:
   (a) transporting a tow through an aqueous ceramic-forming solution to provide a coated tow having a layer of uncured coating thereon,
   (b) transporting the coated tow through a hydrocarbon liquid which is immiscible with the coating solution and
   (c) curing the coating on the tow to provide a coated tow having a layer of cured coating on the individual filaments thereof,
   wherein the tow has contact only with the coating solution and the immiscible liquid between the uncoated state of the tow prior to coating step (a) and the cured, coated state of the tow subsequent to curing step (c),
   wherein said tow comprises a plurality of fibers selected from the group consisting of carbon, graphite, silica, silicon carbide, silicon nitride, silicon carbide-coated boron, boron carbide-coated boron, silicon-coated silicon carbide, alumina, mullite, yttrium-aluminum oxides, beryllium-titanium composites, and boron-aluminosilicate, and
   wherein said ceramic-forming solution is selected from the group consisting of silicates, aluminates, yttriates, titanates, zirconates, and combinations thereof.

* * * * *